MAGNETIC INFORMATION STORAGE DEVICES

Filed Sept. 17, 1959

Inventor
A. E. BREWSTER
By E. H. Suydam
AGENT 3,045,216

MAGNETIC INFORMATION STORAGE DEVICES

Arthur Edward Brewster, London, England, assignor to International Standard Electric Corporation, New York, N.Y.

Filed Sept. 17, 1959, Ser. No. 840,771
Claims priority, application Great Britain Nov. 14, 1958
7 Claims. (Cl. 340—174)

The present invention relates to magnetic information storage devices arranged to operate as threshold limiters.

Such an arrangement is useful, for example, as a pulse sampling arrangement, such as is required in some types of decoders for pulse code modulation systems of communication.

In the case of the decoder described in the specification of co-pending U.S. application Serial No. 800,708, filed March 20, 1959, and assigned to the assignee of the present application, the digit pulses which make up the code combinations corresponding to samples of the signal wave are received in succession on a single conductor, and it is necessary to convert each code group into a group of pulses which occur simultaneously on separate conductors, and in which each pulse of the original group is represented by a positive pulse, and an absent pulse by a negative pulse of the same amplitude.

The above described conversion of pulse code combinations is accomplished in accordance with the invention by providing two ferromagnetic cores capable of being switched from one state of magnetic saturation to the opposite state of saturation in accordance with certain predetermined values of magnetic flux induced therein by windings carrying biasing currents, coded input pulses representing the momentary amplitude of the signal wave, and by triggering pulses having a predetermined volt-time product as fully hereinafter described. The magnitudes and directions of the required fluxes are determined by the number of turns on the various windings, the magnitudes of the currents flowing therein and the direction of current flow with respect to the cores. Threshold limiting is accomplished by adjusting the biasing current so that the flux produced thereby exceeds the flux produced by the noise.

The frequency of recurrence of the triggering pulses should be equal to, and properly phased with the repetition rate at which the signal pulses are sampled. When the above conditions are fulfilled, a trigger pulse will induce a pulse in an output winding on one or the other of the cores; the polarity of the induced pulse being dependent on the presence or absence of a signal pulse at the time of triggering.

The output pulses of either or both polarities are stored in succession in a storage device from which they may be read out simultaneously on separate conductors.

The primary object of the invention is to devise a circuit arrangement which will limit the threshold value of an input signal pulse.

Another object of the invention is to devise a pulse code converter employing a plurality of threshold limiters equal in number to the number of digits in the code.

The above-mentioned and other features and objects of this invention and the manner of attaining them will become more apparent and the invention itself will be best understood by reference to the following description of an embodiment of the invention taken in conjunction with the accompanying drawings, in which.

Figures 1, 2, 3:
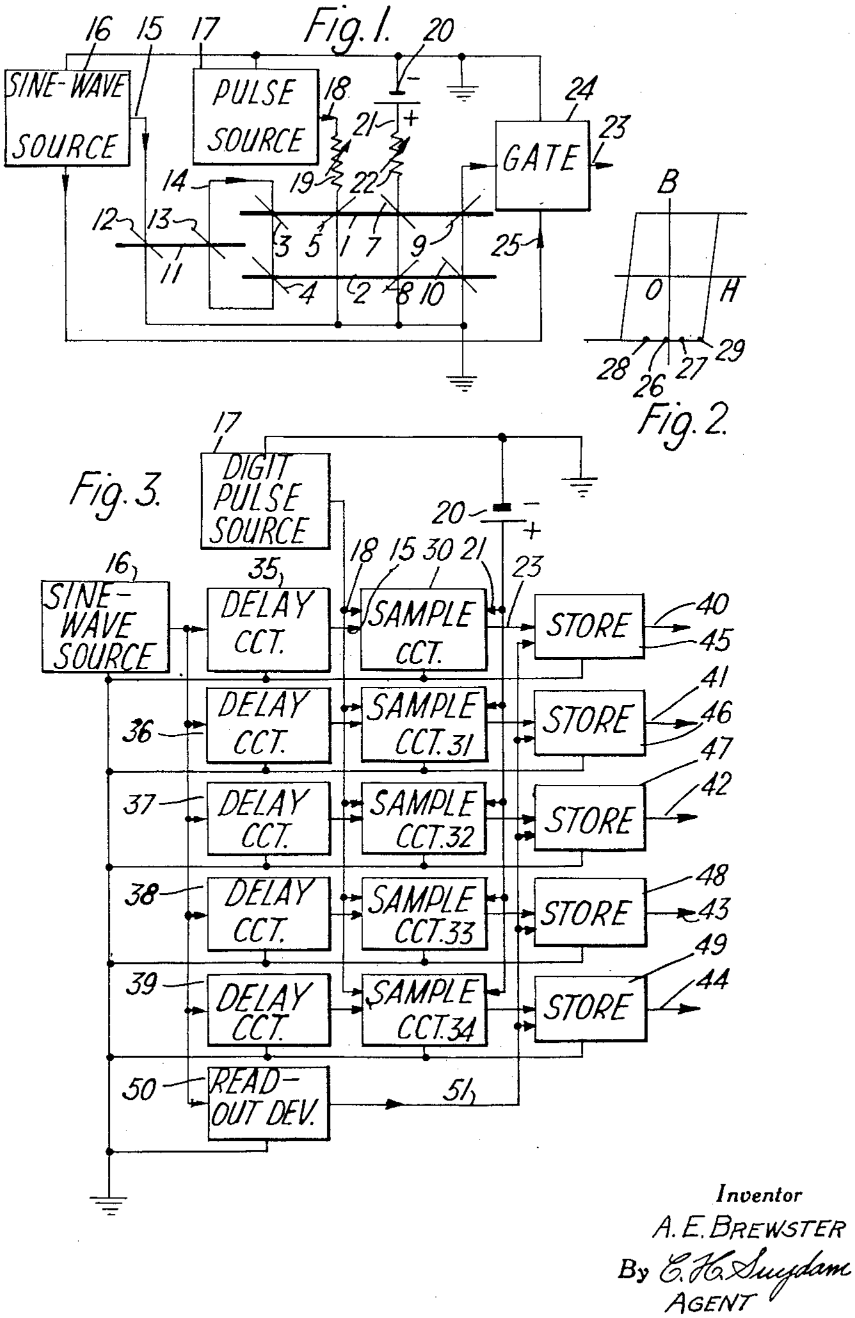
FIG. 1 shows a schematic circuit diagram of a magnetic threshold limiter or sampling circuit according to the invention.
FIG. 2 shows a hysteresis curve used in explaining the operation of FIG. 1.
FIG. 3 shows a block schematic circuit diagram to illustrate the use of circuits according to FIG. 1 in a code converting arrangement.

The operation of the embodiments of the invention depends on the use of triggering or switching pulses of defined volt-time product. The meaning of this term will be explained as follows. Such triggering pulses are obtained from a winding on a saturable magnetic core which is triggered, or switched from one condition of saturation to the other, in some suitable way. The electromotive force $e$ generated in such a winding at any time is equal to $n.d\varphi/dt$, where $n$ is the number of turns of the winding, and $d\varphi/dt$ is the rate of change of the flux at that time. In the case of the ferromagnetic materials suitable for magnetic switching or storage devices, the rate of change of the flux is nearly constant during the period when the change of flux is taking place. Thus, approximately $e=n\varphi/t$, where $\varphi$ is the total change of flux between the two conditions, and $t$ is the time taken for the change of flux to occur. So $et=n\varphi$. Now $\varphi$ is determined by the magnetic material, and $n$ is the number of turns of the winding, so the volt-time product $et$ of the output pulse is defined. If such a pulse is applied to a winding of $n$ turns on a second core of the same material, the circuit being assumed to have a negligible resistance, then this pulse is just able completely to switch over the second core before its energy is expended. If a different core material is used for the second core, in which the total flux change which occurs on switching over is $\varphi_1$, then the triggering pulse is just able to switch over the second core if the winding thereon has $n_1$ turns, where $n_1\varphi_1=n\varphi$.

The significance of this is that if the triggering pulse is applied to similar windings on several cores in series, and if the cores are so conditioned (for example, by appropriate biassing) that one of them starts to be switched before any of the others, then that core will be completely switched by the pulse, which will then have no energy left to switch any other core.

The limiter or sampling circuit shown in FIG. 1 includes three similar cores of ferrite material, or other suitable ferromagnetic material with a nearly rectangular hysteresis loop, commonly known in the art as "square loop" material. These cores are preferably small toroidal cores, but in FIG. 1 they are shown for clearness as straight rods. A short inclined line indicates a winding on the core; a line sloping upwards to the left indicates a winding wound "straight" and a line sloping upwards to the right indicates a winding wound "reverse." A vertical line drawn through the intersection of a winding line with the core indicates a conductor with which the winding is in series. A current flowing downwards through a straight winding or upwards through a reverse winding will be assumed to produce a flux from left to right in the core. If the current in either winding is reversed then the direction of the flux is reversed.

The limiter circuit shown in FIG. 1 comprises two similar ferromagnetic cores 1, 2 having triggering windings 3, 4; bias windings 7, 8; and output windings 9, 10. The windings of each pair have the same number of turns, but different pairs may have different numbers of turns. Core 1 also has a pulse winding 5. In practice, for example, all windings could have only one turn.

Windings 5, 8 and 9 are wound reverse, and all others are wound straight.

A third trigger core 11, similar to cores 1 and 2, is provided with input and output windings 12, 13, both wound straight. Winding 13 is connected by a loop conductor 14, preferably of negligible resistance, in series with windings 3 and 4 and should have the same number of turns, for example 1 turn. Winding 12 is in series with an input conductor 15 connected to a sinewave source 16.

A pulse source 17 is connected to a conductor 18 in series with which are an adjustable resistor 19 and the winding 5.

A direct current bias source 20 is connected to a conductor 21 in series with which are an adjustable resistor 22 and the windings 7 and 8. The source 20 should supply a bias current downwards through the windings 7 and 8 so that the core 1 is biassed with a flux from left to right, while the core 2 is biassed with a flux from right to left.

The output windings 9 and 10 are connected in series to an output conductor 23 through a gating circuit 24 which is controlled by the source 16 over a conductor 25. The purpose of this gating circuit will be explained later.

The pulse source 17 should be arranged to supply positive pulses of current downwards through the conductor 18.

Referring to the hysteresis curve of the core material shown in FIG. 2, the cores will initially both be in the condition corresponding to some point on the lower branch of the curve. In the absence of any bias current, both cores will be in the condition corresponding to the point 26. When bias current is supplied from the source 20, the condition of core No. 1 will be moved to the right, to a point such as 27, while the condition of core No. 2 will be moved to the left by an equal amount, to a point such as 28. The bias current should be adjusted by means of the resistor 22 so that the point 27 does not move beyond the lower corner 29 of the curve.

Assuming that the trigger core 11 is in the condition corresponding to the point 26, FIG. 2, then very shortly after the amplitude of the sinewave from the source 16 changes from negative to positive, the core 11 will be triggered and its condition will be switched to the upper branch of the curve, and a short positive trigger pulse will be delivered from the output winding 13 downwards through the windings 3 and 4. This pulse has a defined volt-time product determined by the flux change of the core 11, as explained above, and is of just sufficient magnitude to switch completely only one of the cores 1 or 2. If it be assumed that at the moment of triggering the core 11, no pulse is supplied to conductor 18 from the pulse source 17, then it will be seen that the trigger pulse shifts the point 27 (FIG. 2) representing the condition of core 1 to the right, until this point reaches the corner 29, and the core 1 is thereafter completely switched by the trigger pulse. A negative output pulse is thereby delivered to the conductor 23 through the gating circuit 24 which is open at this time. At the same time, the point 28 (FIG. 2) corresponding to the condition of core 2 is also moved to the right by the trigger pulse, and since all the energy of the pulse is used up in switching core 1, the point 28 cannot reach the corner 29, so that core 2 does not become switched.

Now suppose that there is an input pulse from source 17 present when core 11 is triggered. The flux due to the input pulse opposes the bias flux in core 1 because the pulse winding 5 is wound oppositely to the bias winding 7. If the resistor 19 be adjusted so that the maximum flux due to the input pulse is greater than twice the bias flux, then the point 27 representing the condition of core 1, will be shifted to the left of the point 28 (FIG. 2), and core 2 will be switched by the trigger pulse instead of core 1. This time a positive output pulse will be delivered to the output conductor 23 from the output winding 10. Thus it will be seen that if an input pulse is present, a positive output pulse is produced, while if no input pulse is present the output pulse will be negative.

It will be noted that the input pulse from the source 17 can only cause the core 2 to be switched instead of the core 1 if its current amplitude exceeds twice the bias current supplied to conductor 21 (assuming that the windings 5, 7 and 8 all have the same number of turns). The arrangement thus acts as a threshold limiter; and if, for example, the input pulse is accompanied by noise, its presence or absence could be detected by a quite sensitive detector (not shown) connected to conductor 23 without confustion by the noise, provided that the bias current is adjusted to produce a flux exceeding that produced by the noise. It is, of course, necessary that the hysteresis loop (FIG. 2) should be wide enough to ensure that the point 27 corresponding to the condition of core 1, is on the lower part of the curve.

The output windings 9 and 10 (FIG. 1) may be arranged in various other ways, according to the use which will be made of the output pulses produced thereby. For example, the output windings could be connected to separate output circuits, in which case they could be wound in the same direction, the essential point being that it should be possible to determine from the output pulse which of the two cores 1, 2 has been switched.

Various other minor modifications of FIG. 1 are possible. For example, the bias winding 8 on core 2 could be omitted, in which case the condition of core 2 is represented by the point 26 instead of point 28 (FIG. 2). Then the presence of an input pulse will be detected if its current amplitude exceeds the bias current instead of twice the bias current.

According to another modification, the bias winding 8 is retained, and an additional pulse winding (not shown) is provided on core No. 2, wound straight, that is, in the opposite direction to the bias winding 8, and is connected in series with conductor 18. In that case the input pulse moves the point 27 to the left and also the point 28 to the right by the same amount, and its presence will be detected so long as its current amplitude exceeds the bias current, so that the relative positions of the points 27 and 28 are interchanged. However, with this arrangement an upper limit is set to the amplitude of the input pulse, because it must not be so great that the point 28 is moved by the pulse beyond the point 29. The previously described arrangements do not have this limitation.

In the case when the circuit of FIG. 1 is used as a sampling circuit to determine whether a pulse is present or absent at each of a number or regularly recurring sampling instants, the frequency of the sinewave source 16 should be equal to the frequency of recurrence of the sampling instants, and the output sinewaves should be so phased that the core 11 is triggered at each of these instants. It will be noted that the trigger core 11 will be switched back to the initial condition halfway between each pair of sampling instants when the sinewave amplitude changes sign from positive to negative. This will also switch back again or reset the core 1 or 2 which was switched at the preceding sampling instant, and an unwanted output pulse will be generated by the winding 9 or 10. To prevent such unwanted output pulses from reaching conductor 23, the gate circuit 24 is provided. This is controlled in conventional manner by the sinewave source 16 so that the gate circuit is only open for a short period before and after each sampling instant, thereby allowing only the wanted output pulses to reach conductor 23. Other methods of suppressing the unwanted pulses could be used.

FIG. 3 shows a block schematic circuit diagram illustrating the use of sampling circuits according to FIG. 1 with a decoder for a five-digit code. Five sampling circuits according to FIG. 1 are provided, but without the gating circuit 24, and sharing the elements 16, 17, and 20 in common. These five sampling circuits are designated 30 to 34 in FIG. 3. The conductors 15, 18, 21 and 23 of the sampling circuit 30 are designated as in FIG. 1.

The sinewave source 16 is connected to the conductors 15 of the five sampling circuits 30 to 34 through delay devices 35 to 39, and the output conductors 23 are connected to five digit conductors 40 to 44 through corresponding storage devices 45 to 49. The delay devices can comprise any suitable delaying or phasing means. Each of the delay devices 36 to 39 should introduce delay which exceeds that of the preceding delay device by the digit pulse repetition period, and the delays should be such that one of the cores 1 or 2 of each sampling circuit is due to be switched at the time when the corresponding digit pulse appears (if it is present). Thus it will be seen that the five digit pulse time positions are inspected in turn, and if a digit pulse is present a positive output pulse is delivered to the corresponding output conductor 23 and if it is absent a negative output pulse is delivered.

Each of the storage devices 45 to 49 should store the positive or negative output pulse supplied by the corresponding sampling circuit. A read-out device 50 is controlled by the sinewave source 16 in such a manner that it produces a reading-out pulse shortly after the last output pulse has been stored in the storage device 49. The reading-out pulse is supplied simultaneously over conductor 51 to all the storage devices 45 to 49 and causes them to deliver the stored positive or negative output pulses simultaneously to the five digit conductors 40 to 44.

The read-out device 50 should supply only one reading-out pulse per cycle of the sinewave, so that the unwanted output pulses, which are produced and stored when the sampling circuits are reset, are not read out of the storage circuits. The storage and reading out arrangements have not been described in detail since they are conventional.

The frequency of the sinewave supplied by the source 16 should be equal to the repetition frequency of the code combinations of digit pulses, so that each combination is scanned immediately after the preceding one has been scanned.

While the principles of the invention have been described above in connection with specific embodiments, and particular modifications thereof, it is to be clearly understood that this description is made only by way of example and not as a limitation on the scope of the invention.

What I claim is:

1. A threshold limiting arrangement for determining whether or not an input pulse of amplitude exceeding a given threshold is present at a given instant comprising: first and second similar cores of square-loop ferromagnetic material; means for supplying at the given instant a trigger pulse to a trigger winding on each of said cores, said trigger pulse having a defined volt-time product whereby not more than one core can be switched by said trigger pulse at said instant; means for supplying input pulses and a bias current to respective windings on at least one of each of said cores whereby one of the cores is switched by the trigger pulse if an input pulse of amplitude exceeding the given threshold is present at the said instant while the other core is switched by the trigger pulse if no such input pulse is present at the said instant; and an output winding on each core for deriving from the cores an output pulse which indicates which core has been switched by the trigger pulse.

2. A threshold limiting arrangement according to claim 1 in which the means for supplying the trigger pulse comprises: a third core of ferromagnetic material similar to the first-mentioned cores; input and output windings on the said third core; means for supplying a trigger wave to the input winding; and a circuit of negligible resistance connecting the output winding on the said third core in series with the trigger windings on the said first and second cores.

3. A threshold limiting arrangement according to claim 1 in which the bias current is supplied to a bias winding on first core, in such direction as to produce a bias flux therein in the same direction as the flux produced by the trigger pulse, and in which the input pulses are supplied to a pulse winding on the said first core in such manner that, when an input pulse of amplitude exceeding the given threshold is present, it produces a flux in the first core in opposition to, and exceeding, the bias flux.

4. A threshold limiting arrangement according to claim 1 in which the bias current is supplied to a bias winding on each of the said first and second cores in such direction as to produce a bias flux in the same direction as the flux produced by the trigger pulse in the first core, and and in the opposite direction to the flux produced by the trigger pulse in the second core, and in which the input pulses are supplied to a pulse winding on the first core in such manner that, when an input pulse of amplitude exceeding the given threshold is present, it produces a flux in the first core in opposition to, and exceeding twice, the bias flux.

5. A modification of the threshold limiting arrangement according to claim 4 in which the input pulses are also supplied to a pulse winding on the second core in such manner that, when an input pulse of amplitude exceeding the given threshold is present, it produces a flux in the second core in opposition to the bias flux therein, the bias fluxes in the two cores being equal, and the flux due to the input pulse in each core exceeding the bias flux in each core, but not being sufficient to cause either core to be switched in the absence of a trigger pulse.

6. A threshold limiting arrangement according to claim 1 in which the said first and second cores are provided with respective output windings connected to an output circuit in such manner that a positive output pulse is delivered to the output circuit when one core is switched, and a negative output pulse is delivered to the output circuit when the other core is switched.

7. A code converting arrangement for a pulse code of *n* digits comprising: *n* threshold limiting arrangements according to claim 2, in which input pulses comprise code combinations of digit pulses supplied in common to all the limiting arrangements, and in which the means for supplying a triggering wave is shared in common by all the limiting arrangements; means for applying the triggering wave to the limiting arrangements through delay means whereby that the cores in the limiting arrangements are switched one at a time in turn at the instants when the corresponding digit pulses, if present, are due to arrive; and storage and read-out means connected to said limiting arrangement for supplying the output pulses from all the limiting arrangements respectively to *n* digit conductors, whereby output digit pulses corresponding to each code combination appear simultaneously on the *n* digit conductors.

References Cited in the file of this patent

UNITED STATES PATENTS

| | | |
|---|---|---|
| 2,768,367 | Rajchman | Oct. 23, 1956 |
| 2,801,344 | Lubkin | July 30, 1957 |
| 2,937,285 | Olsen | May 17, 1960 |